United States Patent
Oxborrow et al.

(10) Patent No.: US 8,291,881 B2
(45) Date of Patent: Oct. 23, 2012

(54) PISTON FOR INTERNAL COMBUSTION ENGINE

(75) Inventors: James Stuart Oxborrow, Corby (GB); Tom Mackay, Inverness (GB); Mohammad Parsi, London (GB)

(73) Assignee: Perkins Engine Company Limited, Peterborough (GB)

( * ) Notice: Subject to any disclaimer, the term of this patent is extended or adjusted under 35 U.S.C. 154(b) by 485 days.

(21) Appl. No.: 12/644,831

(22) Filed: Dec. 22, 2009

(65) Prior Publication Data

US 2011/0146613 A1 Jun. 23, 2011

(51) Int. Cl.
*F02F 3/00* (2006.01)
(52) U.S. Cl. .................... 123/193.6; 92/222; 92/231
(58) Field of Classification Search ............ 123/193.6; 92/222, 231
See application file for complete search history.

(56) References Cited

U.S. PATENT DOCUMENTS

| 4,788,942 | A  | * | 12/1988 | Pouring et al. ............ 123/26 |
| 5,000,144 | A  |   | 3/1991  | Schweinzer et al. |
| 6,708,666 | B2 | * | 3/2004  | Roberts, Jr. ............. 123/256 |
| 7,131,418 | B2 | * | 11/2006 | Wieland ................. 123/193.6 |
| 7,438,039 | B2 |   | 10/2008 | Poola et al. |
| 2005/0172926 | A1 |   | 8/2005  | Poola et al. |

FOREIGN PATENT DOCUMENTS

| EP | 0861973 A1 | 9/1998 |
| EP | 0 911 500 A2 | 4/1999 |
| EP | 1571324 A2 | 9/2005 |
| FR | 1358301 A | 4/1964 |
| GB | 2353328 A | 2/2001 |
| JP | 5-141247 A | 6/1993 |
| JP | 10-212959 A | 8/1998 |
| JP | 2001-254621 A | 9/2001 |
| WO | 2008086939 A1 | 7/2008 |
| WO | 2008145503 A1 | 12/2008 |

\* cited by examiner

*Primary Examiner* — Marguerite McMahon
*Assistant Examiner* — James Kim

(57) ABSTRACT

A piston for a compression ignition internal combustion engine includes a crown portion, torroidal portion, and a reentrant portion. The piston further has a recess portion about a central axis of the piston designed to reduce temperatures near a tip portion of the fuel injector.

19 Claims, 4 Drawing Sheets

PISTON FOR INTERNAL COMBUSTION ENGINE

TECHNICAL FIELD

This disclosure relates to a compression ignition, internal combustion engine. More specifically this disclosure relates to a piston with improved performance.

BACKGROUND

Design of internal combustion engines requires delicately balancing competing requirements of low emissions and low fuel consumption. Governments generally limit the production of various emissions including NOx, smoke, soot, and unburned hydrocarbons. Reducing NOx emissions may be accomplished through various techniques. Many of these techniques require lowering combustion temperatures and in turn increasing fuel consumption.

Users of the engines in industrial environments such as work machines require that they operate over a wide range of speeds and loads while still meeting the emission requirements and while achieving reasonable fuel consumption. In particular, high speed (up to 2500 rpm), medium-bore (cylinder bores between 100 mm and 175 mm), compression ignition engines used in work machines may repeatedly cycle between a high speed, high load condition and an idle condition. Meeting emissions requirements through these transients requires a flexible combustion system. Additionally, compared with light duty operation seen in automotive engines, these engines operate a larger portion of their life in conditions that may contribute to fouling of fuel injectors.

To meet these challenges, designers must work with various tools to achieve a combustion cycle that meets the above needs. These tools include fuel injection equipment, air flow control, and design of the combustion chamber. In small bore (bore diameters of less than 100 mm) engines, air system geometries may be used to introduce air into the combustion chamber in a manner that generates swirling motion within the combustion chamber. The smaller bore engines may operate at higher speeds (in excess of 2500 rpm) and require faster mixing of fuel and air. The air system creates a swirling motion to increase mixing of fuel and air. Combustion chambers with swirl tend to have a narrower throat area compared with the overall piston diameter as shown in U.S. Pat. No. 5,000,144 issued to Schweinzer et al. on 19 Mar. 1991 and European Patent Application No. 0 911 500 published on 28 Apr. 1999. The narrow throat area creates a greater squish area between a top of the piston and cylinder head. Fuel injected into these combustion chambers is intended to enter a torroidal portion without contacting a floor portion. Schweinzer also shows a recess that allows the piston to approach a top dead center position in the cylinder without hitting a fuel injector tip. However, Schweinzer does not discuss interaction of air in the recess with performance of the injector.

Large-bore (180 mm diameter or greater), medium speed (between 900 and 1500 rpm), compression ignition engines tend to use quiescent or semi-quiescent open combustion chamber designs. These designs introduce air into the combustion chamber in a manner that generates little or no swirling motion of the gases about a central axis of the combustion chamber. Higher fuel injection pressures in these types of combustion chambers create motion to promote mixing of fuel and air. Also, finer drop sizes increase surface area exposed to air. These combustion chamber designs also have less squish area available to provide air to the torroidal section. U.S. Pat. No. 7,438,039 issued to Poola et al. on 21 Oct. 2008 discloses using an acute angle reentrant on a large bore, medium speed diesel to improve air flow in a quiescent or semiquiescent combustion chamber. Poola also teaches placing a recess near a tip of the fuel injector. The recess in Poola generally is thought of as an aid in removal of the piston from the engine for servicing. Again, Poola does not explain the interaction of air in the recess with fuel injector tip.

None of these references discuss the importance of improved air flow around the tip of the fuel injector. Without appropriate air flow, combustion characteristics of the engine may change over the its life or during certain conditions. For instance, high temperatures about the tip of the injector may cause increased fouling of the fuel injector tip over time. These changes may reduce the ability of the engine to meet both the customer requirements of low fuel consumption and the regulatory requirement of low emissions.

The current piston disclosed in this application addresses one or more aspects set out above to improve combustion in a medium-bore, high speed, compression ignition engine.

SUMMARY OF INVENTION

In a first aspect a piston for an engine is disclosed having a crown portion with an outer diameter and an inner diameter wherein a ratio the inner diameter to outer diameter is greater than 0.65. The piston is a reentrant design bowl including a reentrant portion, torroidal portion, and floor portion leading to a recess portion about a central axis of the piston. The floor portion has a floor angle of about 65 to 70 degrees. The recess portion has a recess depth that is less than a maximum bowl depth.

In a further aspect, a piston for an internal combustion engine is disclosed having a crown portion having an outer diameter and an inner diameter wherein a ratio of the inner diameter to the outer diameter is greater than 0.65. The reentrant bowl design includes a reentrant portion, torroidal portion, and a floor portion. A recess portion is connected to the floor portion by a recess transition portion. The recess portion has a recess depth that is less than the bowl depth.

In yet another aspect, a piston for an internal combustion engine is disclosed having a crown positioned about a central axis. An outer diameter of the crown is about 105 mm and the ratio of the inner diameter to the outer diameter is between about 0.65 and 0.75. The reentrant bowl design includes a reentrant portion with a reentrant angle of about 63 to 68 degrees. A torroidal portion defines a maximum bowl depth. A recess portion has a ratio of a recess diameter to the inner diameter being about 0.09.

These and additional features will become clearer from the following specification of a preferred embodiment.

DETAILED DESCRIPTION

Reference will now be made in detail to specific embodiments or features, examples of which are illustrated in the accompanying drawings. Generally, the same or corresponding reference numbers will be used throughout the drawings to refer to the same or corresponding parts. It should be appreciated that the terms "upper," "lower," "top," "bottom," "up," "down," and other terms related to orientation are being used solely to facilitate the description of the objects as they are depicted in the figures and should not be viewed as limiting the scope of this description to the orientations associated with each of these terms. All dimensions provided should be understood to include conventional tolerances associated with manufacturing processes such as machining, casting, or the like.

Figure 1:
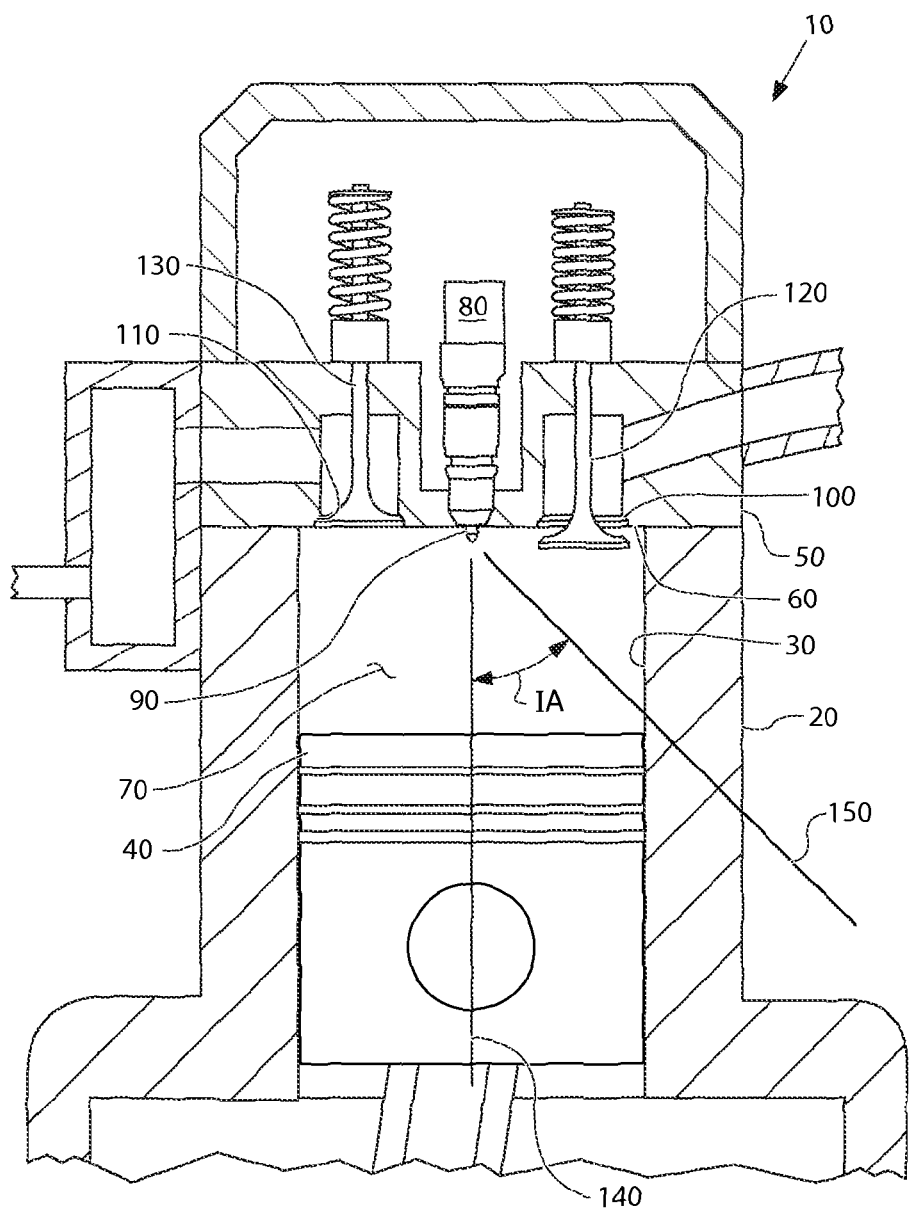
FIG. 1 shows a partial cross-sectional view of a compression ignition engine.

As best shown in FIG. 1, an engine 10 is made up of a block 20 defining a cylinder 30. A piston 40 is positioned in the cylinder in a slideable manner. The cylinder 30 may also be formed by a cylinder liner (not shown) positioned in the block 20 wherein the cylinder liner defines the cylinder 30. A cylinder head 50 connects to the block 20. The cylinder head 50 has a cylinder facing portion 60. The cylinder facing portion 60, the piston 40, and the cylinder 30 define a combustion chamber 70. A fuel injector 80 is positioned in the cylinder head 50 and has a tip portion 90 with a plurality of nozzles (not shown) adapted to direct fuel into the combustion chamber 70. The cylinder head 50 also defines at least one inlet port 100 and at least one exhaust port 110. An inlet valve 120 moves within the cylinder head 50 to at least partially block the inlet port 100. Similarly, an exhaust valve 130 is positioned in the cylinder head 50 to at least partially block the exhaust port 130. The tip portion 90 of the fuel injector 80 has an injection angle IA where the injection angle IA is defined as angle between a piston central axis 140 and a nozzle central axis 150.

Figure 2:
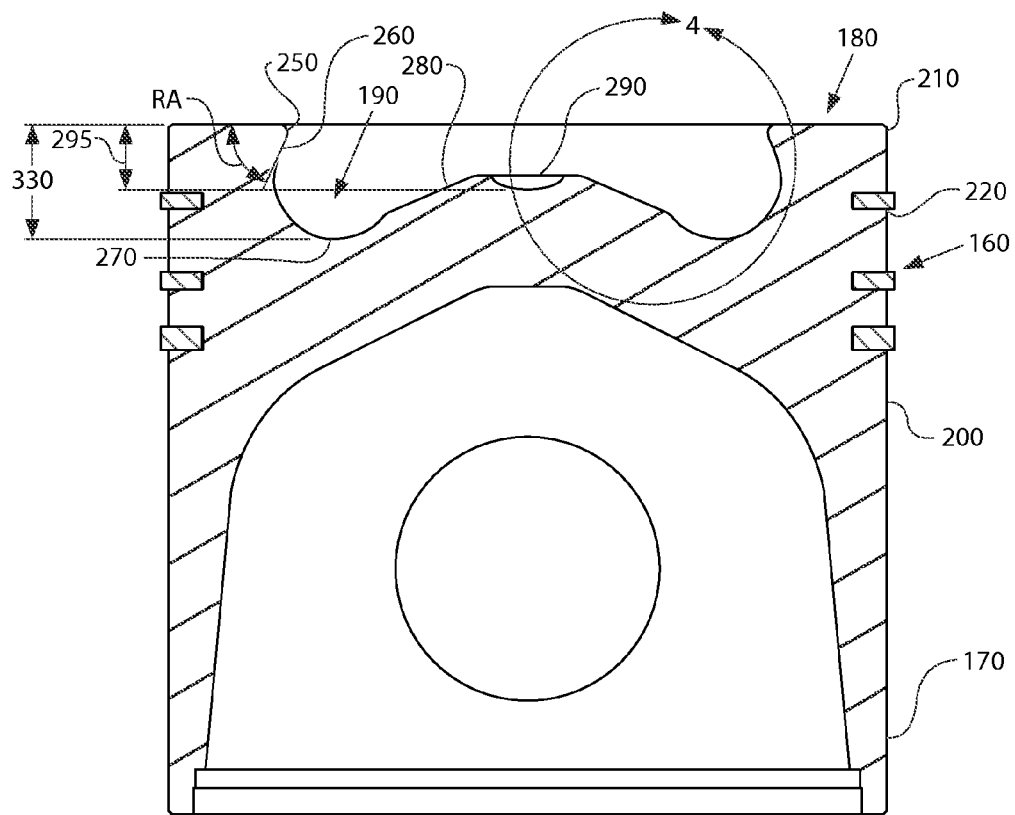
FIG. 2 shows a cross-sectional view of the piston of FIG. 1.

The piston as shown in FIG. 2 has a land 160, a skirt 170, a crown 180, and a bowl 190. The land 160 has a first end portion 200 and a second end portion 210. The second end portion contains a ring groove 220. The crown portion 180 is proximate the second end portion 210 of the land portion 160. The skirt 170 is adjacent the first end portion 200 of the land 160. The bowl 190 has a bowl volume Vb defined by a crown transition portion 250, a reentrant portion 260, a torroidal portion 270, a floor portion 280, and a recess portion 290. In the present embodiment, the bowl volume Vb is about 57 cc. The crown transition portion 250 is preferably a radius of 1.5 mm that transitions from the crown 180 to the reentrant portion 260. However, a smaller radius or edge may also be used for the crown transition portion 250. The reentrant portion 260 is a partial conical surface connecting the crown transition portion 250 with the torroidal portion 270 and has a reentrant angle RA of between 63 and 68 degrees with the crown 180. The recess portion 290 is a partial spherical surface formed by a radius of about 9 mm with a recess depth 295 of about 9.4 mm from the crown 180. The recess portion 290 in the present embodiment has a volume Vr of about 0.1 cc. The volume of the recess may also be described by the equation $Vr \geq KVb$ where K is a constant of about 0.002.

Figure 3:
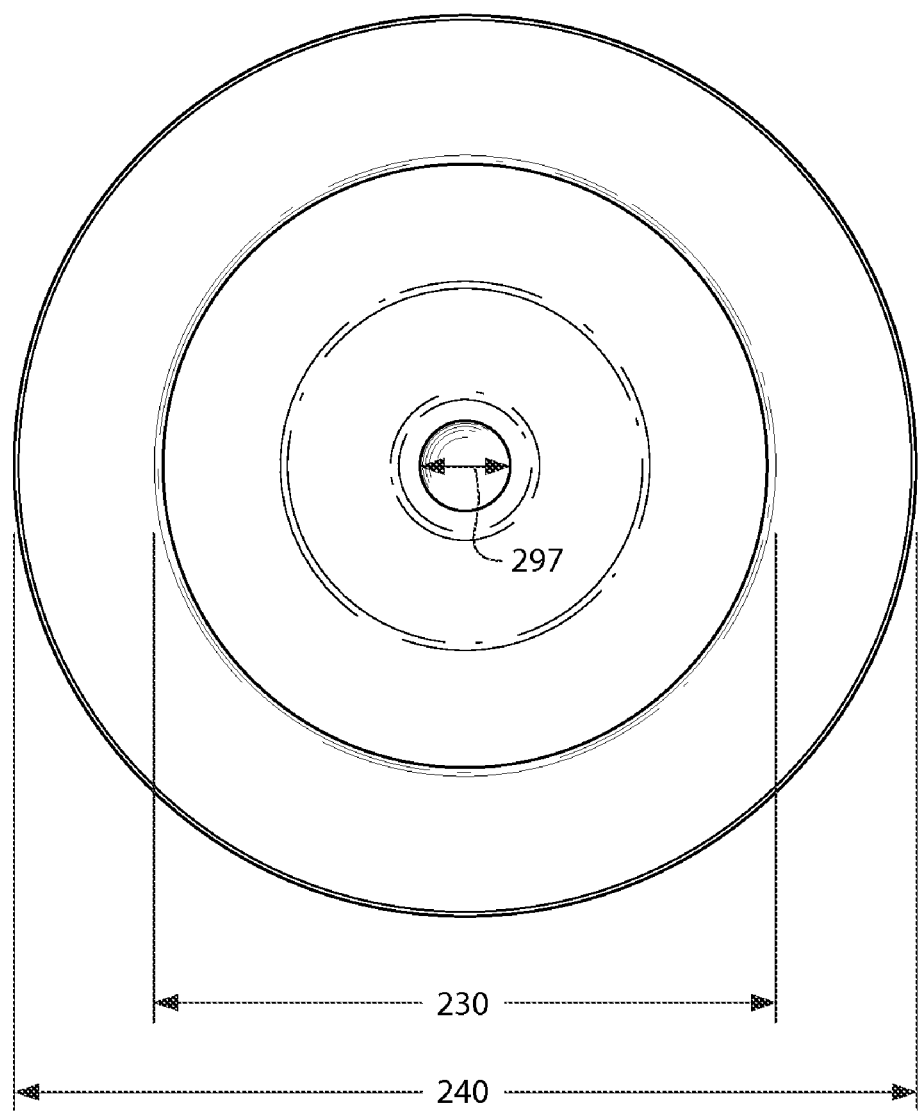
FIG. 3 shows a top view of the piston of FIG. 2.

The crown 180 as best shown in FIG. 3 is ring shaped and has an inner diameter 230 measured from the intersection of the crown transition portion with the crown 180. An outer diameter of the crown 240 is measured from the land 160. The recess portion 290 has a recess diameter 297 measured at a location where a line tangent to the recess portion is perpendicular with the piston central axis. In the present embodiment, the outer diameter is about 105 mm. The ratio of the inner diameter 230 to outer diameter 240 is between 0.65 and 0.75. The ratio of the recess diameter 297 to the inner diameter 240 is about 0.09.

Figure 4:
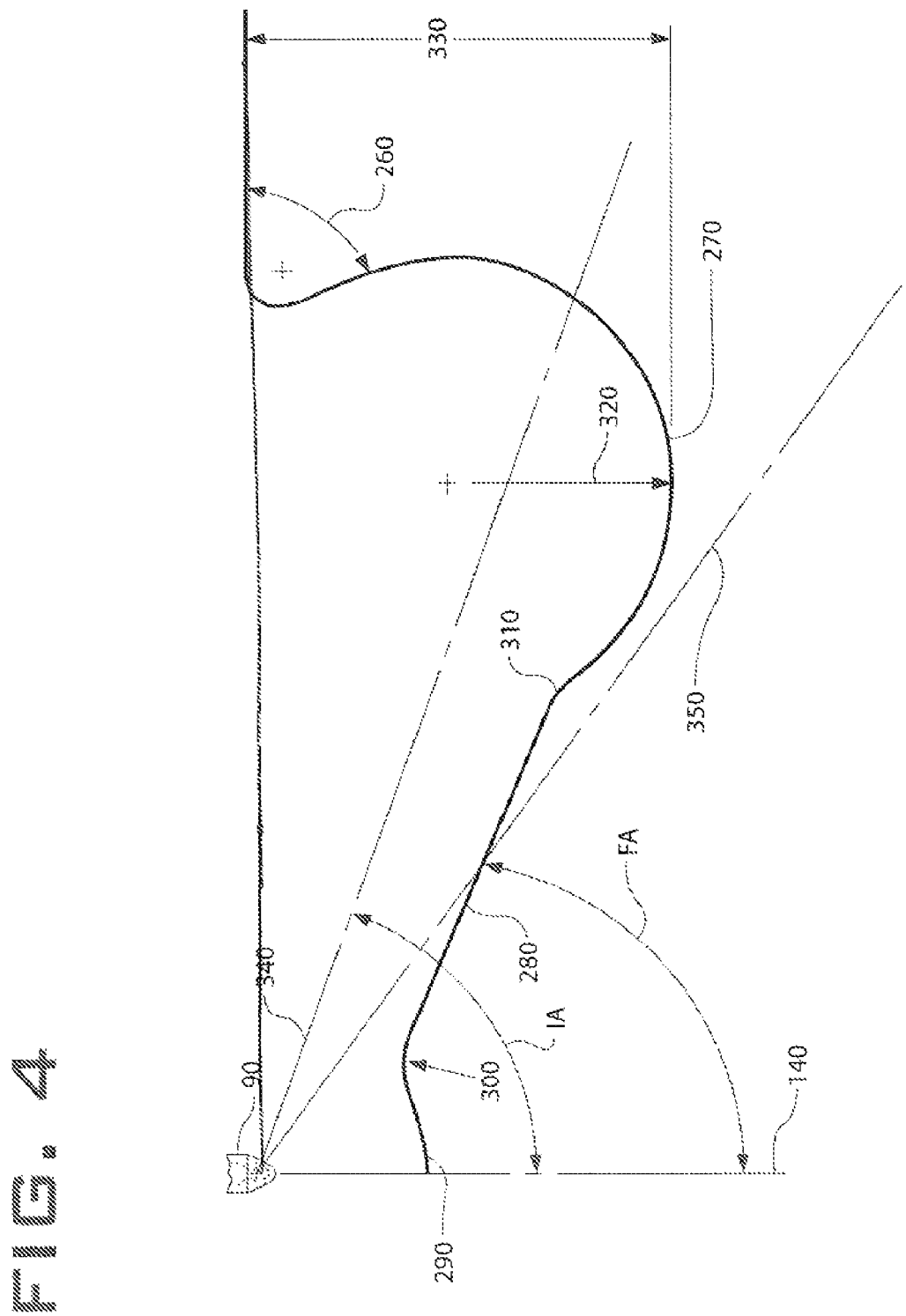
FIG. 4 shows an enlarged cross-sectional detail of "A" in FIG. 2.

Greater detail of the floor portion in FIG. 4 shows a floor angle FA of between 65 and 70 degrees defined in reference to the piston central axis 140. The recess transition portion 300 connects the floor portion 280 with the recess portion 290. A floor transition portion 310 connects the floor portion 280 with the torroidal portion 270. Both the recess transition portion 300 and the floor transition portion 310 may be formed by radiuses of 3 mm or less. The torroidal portion 270 is formed by a radius 320 and connects the floor transition portion 310 with the reentrant portion 260. In this embodiment, the radius 320 is about 9 mm with maximum bowl depth 330 of about 16.8 mm.

Industrial Applicability

During operation, the piston 40 moves downward drawing an oxidant like air through the inlet port 100 past the intake valve 120 (intake stroke). The inlet port 100 closes at some time prior to operation of the fuel injector 80 introducing fuel into the combustion chamber 70. As the piston 40 moves toward the cylinder head 50 and the both the inlet port 100 and exhaust port 110 are blocked by the respective inlet valve 120 and exhaust valve 130, the piston 40 compresses the oxidant within the combustion chamber 70 (compression stroke) including the recess portion 290. The piston 40 eventually begins to slow and changes direction such that the piston 40 travels away from the cylinder head 50 (working stroke). The fuel injector 80 will supply at least some fuel as the piston 40 nears the transition from the compression stroke to the working stroke (also known as the top dead center position).

In the present embodiment, the fuel injector 80 directs a fuel jet portion 340 toward the torroidal portion without contacting the floor portion 280. However, a fuel plume portion 350 will vaporize and come in contact with the floor portion 280. The fuel plume portion 350 contacting the floor portion 280 slows the combustion process and reduces the rate of temperature rise thus reducing NOx formation. The plume portion 350 moves along the floor portion 280 into the torroidal portion 270 where the floor transition portion 310 allows additional air from the torroidal portion 270 to further mix with un-combusted fuel (not shown). This further mixing increases combustion of the un-combusted fuel and reduces formation of soot. Similarly, the reentrant angle RA of the reentrant portion 260 promotes additional mixing of air into un-combusted fuel and oxidation of soot Air retained in the recess portion 290 during the compression stroke provides additional air for mixing with fuel exiting the fuel injector 80. In particular, the recess portion 290 reduces surface temperatures of the fuel injector 80 by increasing both motion and volume of air near the tip portion 90 at a start of fuel injection. The current embodiment reduces combustion temperatures by about 100 K (180 R) and allows timing of fuel injection to be advanced in order to improve fuel consumption while still meeting emissions requirements. Reducing combustion temperatures near the fuel the tip portion 90 limits fouling of the tip portion 90 and may improve the injector 80 operational life.

Although the preferred embodiments of this disclosure have been described herein, improvements and modifications may be incorporated without departing from the scope from the following claims.

What is claimed is:

1. A piston for a compression ignition engine, comprising:
 a crown portion having an outer diameter and an inner diameter wherein a ratio of said inner diameter to said outer diameter is greater than 0.65;
 a reentrant portion being connected with said crown portion, wherein said reentrant portion having a reentrant angle of about 63 to 68 degrees;
 a torroidal portion being connected with reentrant portion, said torroidal portion defining a maximum bowl depth;

a floor portion being connected with said torroidal portion wherein the floor portion has a floor angle of about 65 to 70 degrees; and a recess portion about a central axis of the piston, said recess portion being connected with said floor portion, said recess portion having a recess depth wherein said maximum bowl depth is greater than said recess depth.

2. The piston of claim 1 wherein said ratio of said inner diameter to said outer diameter is less than 0.75.

3. The piston of claim 1 wherein the recess portion has a recess volume Vr defined by an equation Vr≧KVb where K is a constant of about 0.002 and Vb is a volume of a piston bowl.

4. The piston of claim 3 further comprising a floor transition portion being connected between said floor portion and said torroidal portion wherein said floor transition portion is a radius of about 3 mm.

5. The piston of claim 4 further comprising a crown transition portion being connected between the crown and the reentrant portion wherein said crown transition portion is a radius of about 1.5 mm.

6. The piston of claim 1 wherein the recess portion is a partial spherical surface.

7. The piston of claim 1 wherein said recess portion has a recess diameter wherein a ratio of the recess diameter to said inner diameter is about 0.09.

8. The piston of claim 1 wherein the floor portion being adapted to operate in an engine with a fuel injector having a fuel plume portion contacting said floor portion.

9. A piston for a compression ignition engine, comprising:
a crown portion having an outer diameter and an inner diameter wherein a ratio of said inner diameter to said outer diameter is greater than 0.65;
a reentrant portion being connected with said crown portion;
a torroidal portion being connected with said reentrant portion, said torroidal portion defining a maximum bowl depth;
a floor portion being connected with said torroidal portion wherein the floor portion has a floor angle of 65 degrees or greater;
a recess transition portion being connected with said floor portion; and
a recess portion about a central axis of the piston, said recess portion being connected with said recess transition portion, said recess portion having a recess depth wherein said maximum bowl depth is greater than recess depth.

10. The piston of claim 9 wherein the floor angle is 70 degrees or less.

11. The piston of claim 10 wherein the recess portion is a partial spherical surface.

12. The piston of claim 11 wherein the recess portion has a recess diameter wherein a ratio of the recess diameter to said inner diameter is about 0.09.

13. The piston of claim 9 wherein the floor portion being adapted to operate in an engine with a fuel injector having an injection angle greater than the floor angle.

14. The piston of claim 9 wherein the reentrant angle is about 63 to 68 degrees.

15. The piston of claim 9 further comprising a crown having an outer diameter of about 105 mm.

16. The piston of claim 15 wherein the maximum bowl depth is about 16.8 mm.

17. The piston of claim 16 wherein the recess depth is about 9.5 mm.

18. A piston for a medium bore, compression ignition engine, comprising:
a central axis;
a crown portion positioned about said central axis, said crown portion having an outer diameter of about 105 mm and an inner diameter wherein a ratio of said inner diameter to said outer diameter is between about 0.65 and 0.75;
a reentrant portion being connected with said crown portion, wherein said reentrant portion having a reentrant angle of about 63 to 68 degrees;
a torroidal portion being connected with reentrant portion, said torroidal portion defining a maximum bowl depth;
a floor portion being connected with said torroidal portion wherein the floor portion has a floor angle of about 65 to 70 degrees; and
a recess portion about the central axis of the piston, said recess portion being connected with said floor portion, said recess portion having a recess depth wherein said maximum bowl depth is greater than said recess depth, said recess portion is a partial spherical surface, and a ratio of a recess diameter to the inner diameter being about 0.09.

19. The piston form a medium bore, compression ignition engine of claim 18 wherein the recess portion has a recess volume Vr defined by an equation Vr≧KVb where K is a constant of about 0.002 and Vb is a volume of a piston bowl.

* * * * *